United States Patent
Harrington

(10) Patent No.: US 9,344,319 B1
(45) Date of Patent: May 17, 2016

(54) EDGE-QAM AND M-CMTS CORE TIMING LOCK

(75) Inventor: Michael B. Harrington, Cork (IE)

(73) Assignee: ARRIS Enterprises, Inc., Suwanee, GA (US)

(*) Notice: Subject to any disclaimer, the term of this patent is extended or adjusted under 35 U.S.C. 154(b) by 466 days.

(21) Appl. No.: 13/173,628

(22) Filed: Jun. 30, 2011

Related U.S. Application Data

(60) Provisional application No. 61/360,224, filed on Jun. 30, 2010.

(51) Int. Cl.
*H04J 3/06* (2006.01)
*H04L 27/34* (2006.01)
*H04N 21/61* (2011.01)

(52) U.S. Cl.
CPC ............ *H04L 27/34* (2013.01); *H04N 21/6118* (2013.01)

(58) Field of Classification Search
CPC . H04L 12/2801; H04L 65/4076; H04L 27/34; H04L 41/0896; H04L 41/147; H04L 47/805; H04L 65/80; H04N 21/6118; H04N 7/17318; H04N 21/47202; H04N 21/2385; H04N 7/17309; H04N 21/2402; H04N 21/6168; H04N 21/64322

USPC ........... 370/503, 419, 458, 490, 498; 725/95, 725/98, 100, 111, 118

See application file for complete search history.

(56) References Cited

U.S. PATENT DOCUMENTS

| | | | |
|---|---|---|---|
| 2006/0013262 A1* | 1/2006 | Downey et al. | 370/503 |
| 2006/0168612 A1* | 7/2006 | Chapman et al. | 725/11 |
| 2007/0195824 A9* | 8/2007 | Chapman et al. | 370/490 |
| 2008/0285597 A1* | 11/2008 | Downey et al. | 370/503 |
| 2009/0185574 A1* | 7/2009 | Chapman et al. | 370/419 |
| 2009/0310480 A1* | 12/2009 | Bao et al. | 370/217 |
| 2009/0310596 A1* | 12/2009 | Joyce et al. | 370/352 |
| 2010/0002719 A1* | 1/2010 | Sowinski et al. | 370/458 |
| 2010/0083329 A1* | 4/2010 | Joyce et al. | 725/110 |
| 2011/0215873 A1* | 9/2011 | Montreuil et al. | 331/34 |

* cited by examiner

Primary Examiner — Melanie Jagannathan
Assistant Examiner — Najeebuddin Ansari
(74) Attorney, Agent, or Firm — Lori Anne D. Swanson

(57) ABSTRACT

Systems and methods can provide for Edge-QAM and M-CMTS timing lock. In some implementations, an Edge-QAM can provide for timing lock with an M-CMTS core by observing DOCSIS-SYNC MAC messages. In other implementations, an Edge-QAM can provide for timing lock with an M-CMTS core by observing per-modem ranging MAC messages. In other implementations, an EQAM can provide for timing lock with an M-CMTS core by performing timing lock check and adjustment. Using existing protocol messages defined in the M-CMTS architecture, the EQAM can intercept, snoop, and extract timing values from the M-CMTS core thereby reducing or even eliminating the need for a DTI server.

11 Claims, 7 Drawing Sheets

EDGE-QAM AND M-CMTS CORE TIMING LOCK

RELATED APPLICATION

This application claims priority as a non-provisional utility of U.S. Provisional Patent Application Ser. No. 61/360,224, entitled "Edge-QAM and M-CMTS Core Timing Lock", filed Jun. 30, 2010, which is incorporated herein by reference in its entirety.

TECHNICAL FIELD

This disclosure relates to Edge-QAM and M-CMTS core timing locks.

BACKGROUND

The Data-Over-Cable Service Interface Specification (DOCSIS) was established by cable television network operators to facilitate transporting data packets, primarily internet packets, over existing community antenna television (CATV) networks. In addition to transporting data packets, as well as television content signals over a CATV network, multiple services operators (MSO) also use their CATV network infrastructure for carrying voice, video on demand (VoD) and video conferencing packet signals, among other types.

Broadband services can be delivered via existing cable infrastructure from MSOs, digital subscriber lines (xDSL), integrated service digital network (ISDN), public switched phone networks, or T1 connections from telecommunications operators or internet service providers, satellite from satellite operators, or wireless services (such as, e.g., cellular, 802.11 or Wi-MAX standards, etc.) from wireless service providers, among many others. In some DOCSIS implementations, a modular cable model termination (M-CMTS) architecture can be comprised of components such as, for example, an M-CMTS core, Edge-QAM (EQAM), and DOCSIS Timing Interface (DTI) server. The M-CMTS architecture can provide operators with increased efficiency and availability of network resources.

An element of the communication system architecture is the separation of a downstream physical layer QAM modulation and up-conversion functions from a traditional CMTS to an EQAM. The separation allows the EQAM to support both video and DOCSIS standards thereby enabling operators to use the same network resources to support multiple types of services such as, for example, data, voice and video.

The interface supporting the separation of a broadband communication system (e.g., M-CMTS core) and modulator system (e.g., EQAM) is defined by the DOCSIS standards as a Downstream External PHY Interface (DEPI), which provides for transport of downstream data between M-CMTS core and the EQAM. A component of the DEPI interface is a DTI server, which provides a common frequency from the MCMTS core and EQAM. However, implementing the DTI server can add additional cost, cabling and lower reliability.

SUMMARY

Systems and methods of this disclosure can operate to improve timing between a broadband communication and modulator systems. The broadband communication system can transmit digital data and receive RF data, and can use a first local clock signal. One or more modulators systems can receive digital data, modulate the digital data, and transmit the RF modulated data. The one or more modulator systems being further operable to use a second local clock signal, a communication path for connecting the broadband communication system to the one or more modulator systems. The broadband communication system can include a media access control module operable to provide media access control for data transmissions. The media access control module can transmit a plurality of media access control messages with a first time value, the first time value being based on the first local clock signal, and the modulator system can replace the first time value in the plurality of media access control messages with a second time value based on the second local clock signal and transmit the media access control messages as the RF modulated data to one or more customer premise devices. The modulator system can also adjust the second local clock based on a computation derived from the one or more first time values.

Example methods can include the steps of: generating a first plurality of media access control messages, each of the plurality of media access control messages including a first time value; receiving the plurality of media access control messages including the first time value; extracting the first time value from one of the plurality of media access control messages; setting a local clock signal based on the first time value extracted from one of the plurality of media access control messages; and generating a plurality of second media control messages with a second time value equal to said local clock.

DETAILED DESCRIPTION

Figure 1:
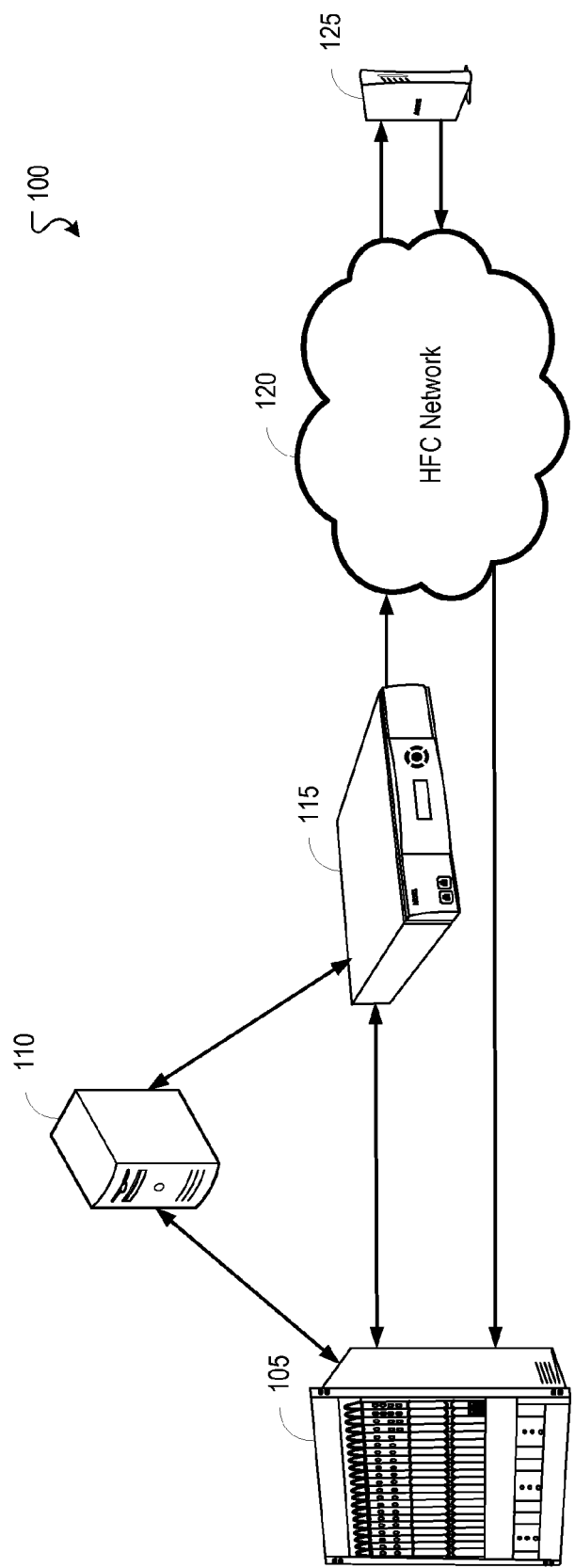
FIG. 1 is a block diagram illustrating an example network environment operable to provide an M-CMTS architecture with a DTI server.

In some implementations of this disclosure, systems and methods can operate to provide EQAM and M-CMTS core timing lock. In some implementations, an EQAM can provide for timing lock with an M-CMTS core by observing DOCSIS-SYNC media access control (MAC) messages. In other implementations, an EQAM can provide for timing lock with an M-CMTS core by observing per-modem ranging MAC messages. In other implementations, an EQAM can provide for timing lock with an M-CMTS core by performing timing lock check and adjustment. Using existing protocol messages defined in the M-CMTS architecture, the EQAM can intercept, snoop, and extract timing values from the M-CMTS core thereby reducing or even eliminating the need for a DTI server.

Systems and methods can operate to provide EQAM and M-CMTS core timing lock using DOCSIS-SYNC MAC messages. In some implementations, an EQAM can receive DOCSIS-SYNC MAC messages originating from an M-CMTS core. Moreover, the EQAM can observe the time value encapsulated in the DOCSIS-SYNC MAC messages. In some implementations, the EQAM can extract the time value and set the local EQAM clock with the extracted value as a starting point. Following the initial setting of the local EQAM clock, the EQAM can use the local clock to overwrite DOCSIS-SYNC MAC messages with time values derived from the EQAM local clock. In other implementations, the EQAM clock can periodically reset the EQAM local clock to newly extracted DOCSIS-SYNC MAC message time values. In still further implementations, another mechanism can be used to initially set the EQAM clock.

Systems and methods can also operate to provide EQAM and M-CMTS core timing lock using per-modem ranging MAC messages. In some implementations, a cable modem (CM) can transmit ranging bursts to the M-CMTS core late. The late ranging bursts can prompt the M-CMTS to transmit per-modem ranging MAC messages to the CM to adjust time values. In some implementations, an EQAM can receive the M-CMTS originating per-modem ranging MAC messages and observe the time value adjustments. In other implementations, an EQAM can store and/or calculate a sample population of CM time value ranging adjustments to make adjustments to the EQAM local time value clock. It should be understood that the sample population of CM time value ranging adjustments can be used to mitigate a timing value error based on ranging problems specific to a particular modem. In alternative implementations, a sample population is not used and per-modem ranging adjustments are made periodically. In still further implementations, a moving average time adjustment can be calculated and used to adjust the EQAM local time clock.

Systems and methods can also operate to provide EQAM and M-CMTS core timing lock check and adjustment. In some implementations, an EQAM can observe M-CMTS core originating DOCSIS-SYNC MAC messages and extract timing values to compare and/or adjust the EQAM local timing clock. For example, an EQAM can observe a short history and/or moving average of DOCSIS-SYNC MAC messages and compare the divergence between the M-CMTS core time value of the EQAM local timing clock. If the time divergence reaches a predefined point, then the EQAM can set appropriate system alarms and/or compensate by increasing the gain factor as a function of the divergence difference magnitude and thus realigning the EQAM clock with the M-CMTS core clock.

FIG. 1 is a block diagram illustrating an example network environment operable to provide the M-CMTS architecture with a DTI server. In some implementations, a DTI server 110 can provide timing information to an M-CMTS core 105 and an EQAM 115. The M-CMTS core can transmit video, data and voice service(s), and/or other signals to an EQAM 115. The EQAM 115 can receive timing data from the DTI server 110 to provide for timely and accurate communication with the M-CMTS core and/or the end user. The EQAM 115 can then transmit downstream video and data through the HFC network 120 to the end user at a CM 125. In some implementations, the M-CMTS core, DTI server, and/or EQAM can be combined into a single unit. In other implementations, the CM can be another customer premise equipment (CPE) device such as, for example, an enhanced multimedia terminal adapter (eMTA) or a gateway (GW).

Figure 2:
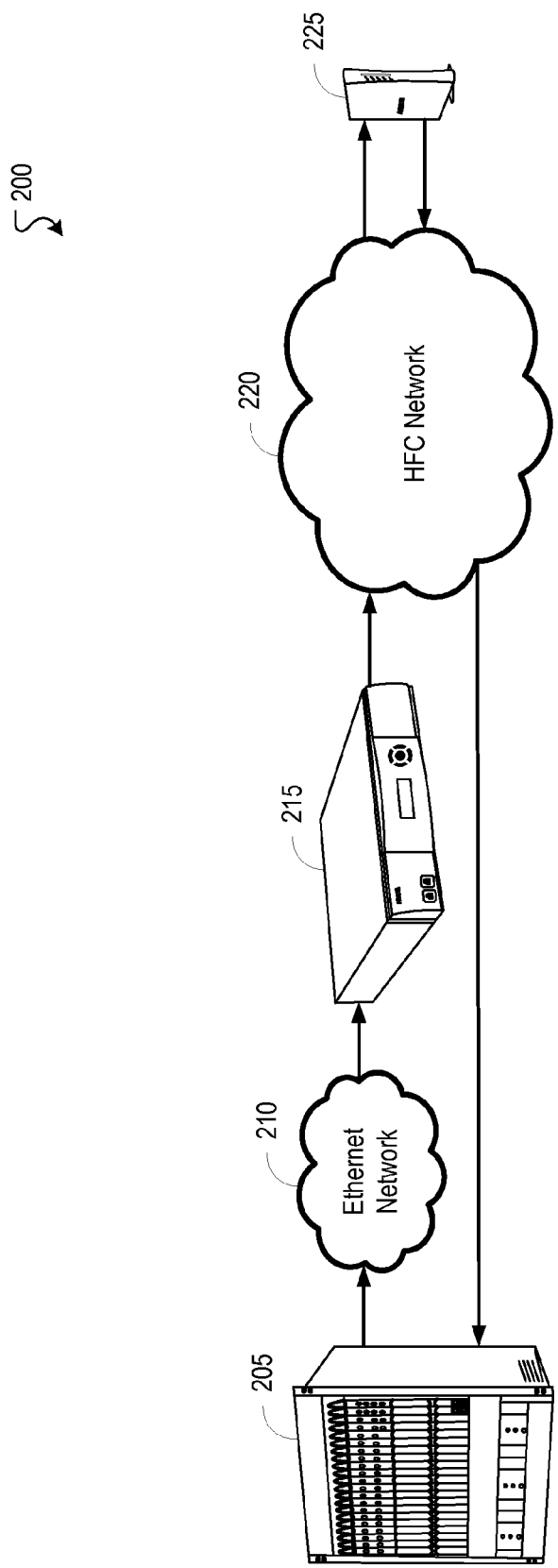
FIG. 2 is a block diagram illustrating an example network environment operable to provide EQAM and M-CMTS core timing lock.

FIG. 2 is a block diagram illustrating an example network environment operable to provide EQAM and M-CMTS core timing lock. In some implementations, an M-CMTS core 205 (e.g., M-CMTS core 105 of FIG. 1) can transmit video, data, voice service(s), and/or other signals through an Ethernet Network 210 to an EQAM 215 (e.g., EQAM 115 of FIG. 1). The EQAM 215 can observe and extract timing data from M-CMTS originating MAC messages to provide for timely and accurate communication with the M-CMTS core and/or the end user. The EQAM 215 can then transmit downstream video and data through the HFC network 220 (e.g., HFC network 120 of FIG. 1) to the end user at a CM 225 (e.g., CM 125 of FIG. 1). In some implementations, the M-CMTS core and/or EQAM can be combined into a single unit. In other implementations, the CM can be another customer premise equipment (CPE) device such as, for example, and enhanced multimedia terminal adapter (eMTA) or a gateway (GW).

Figure 3:
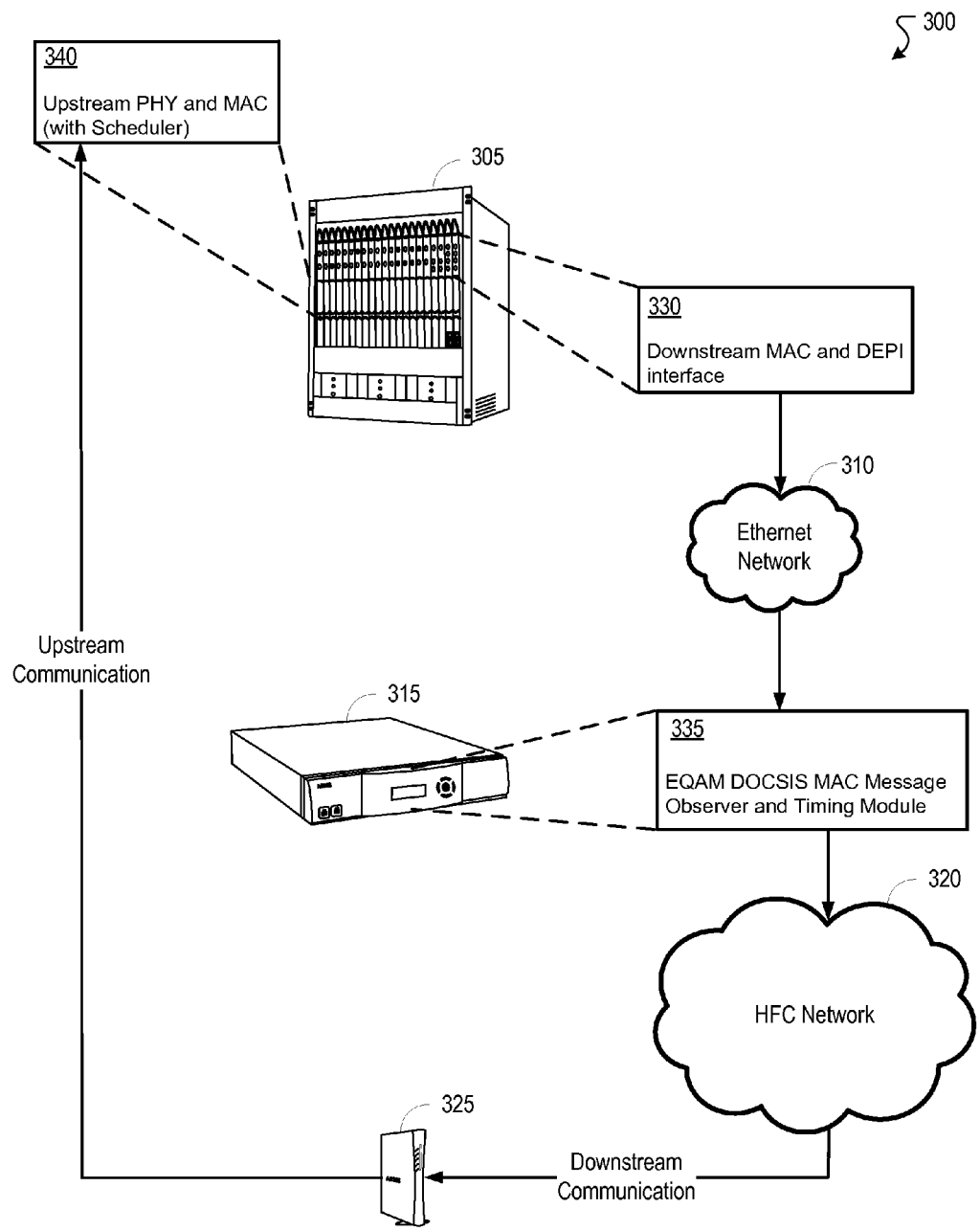
FIG. 3 is a block diagram illustrating an example M-CMTS core and EQAM device operable to provide EQAM and M-CMTS core timing lock.

FIG. 3 is a block diagram illustrating an example M-CMTS core and EQAM device operable to provide EQAM and M-CMTS core timing lock. An M-CMTS core 305 (e.g., M-CMTS core 105 of FIG. 1 and M-CMTS core 205 of FIG. 2) can send voice, video, and/or data through an Ethernet network 310 (e.g., Ethernet Network 210 of FIG. 2) to an EQAM 315 (e.g., EQAM 115 of FIG. 1 and EQAM 215 of FIG. 2). The EQAM can transmit voice, video, and/or data through an HFC network 320 (e.g., HFC network 120 of FIG. 1 and HFC network 220 of FIG. 2) to the end user at a CM 325 (e.g., CM 125 of FIG. 1 and CM 225 of FIG. 2).

An M-CMTS core can include a downstream MAC and DEPI interface 330 that can generate MAC messages with timing information. The MAC messages can include timing information such as, for example, DOCSIS-SYNC MAC messages and per-modem ranging MAC messages, among others. In some implementations, MAC messages can be standardized by the M-CMTS architecture. MAC messages can be transferred through an Ethernet network 310 to an EQAM 315 operable to provide EQAM and M-CMTS core timing lock. An EQAM can include a DOCSIS MAC message observer and timing module 335 that can observe MAC messages originating from the M-CMTS core 305 and set, adjust, or track timing values and differences.

For example, an EQAM 315 can observe DOCSIS-SYNC messages, extract the time value of the M-CMTS core 305, and set the local EQAM 315 timing clock to the extracted value. Moreover, the EQAM 315 can maintain the local clock and replace timing values in M-CMTS core 305 originating messages and/or data with the local EQAM 315 clock value. In another example, an EQAM 315 can observe per-modem ranging MAC messages and proceed to record, track, and reset a local EQAM 315 clock based upon sample population of per-modem (e.g., CPE) ranging MAC messages. In another example, an EQAM 315 can track timing differences, set an alert, and/or adjust the local timing clock based upon moving average differences of DOCSIS-SYNC MAC messages. Upstream communications can occur from the CM 325 to the M-CMTS core 305 upstream PHY and MAC module 340.

Figure 4:
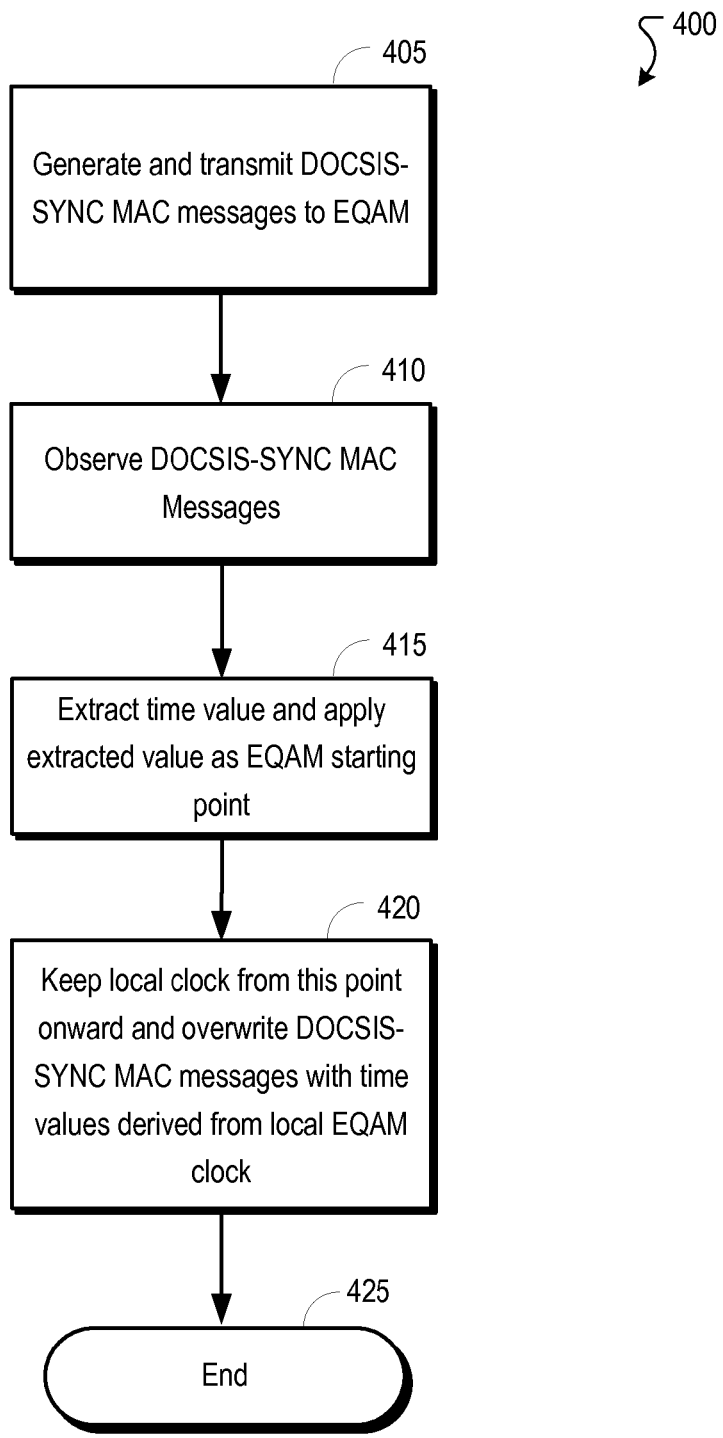
FIG. 4 is a flowchart illustrating an example process operable to provide EQAM and M-CMTS core timing lock using DOCSIS-SYNC MAC messages.

FIG. 4 is a flowchart illustrating an example process operable to provide EQAM and M-CMTS core timing lock using DOCSIS-SYNC MAC messages. The process 400 begins at stage 405 when a DOCSIS-SYNC MAC message is generated and transmitted to an EQAM. The DOCSIS-SYNC MAC message can be generated and transmitted, for example, by an M-CMTS core (e.g., M-CMTS core 105 of FIG. 1 and M-CMTS core 205 of FIG. 2 and M-CMTS core 305 of FIG. 3). In some implementations, the DOCSIS- SYNC MAC message can be generated using a downstream MAC and DEPI interface (e.g., downstream MAC and DEPI interface 330 of FIG. 3) to the EQAM (e.g., EQAM 115 of FIG. 1 and EQAM 215 of FIG. 2 and EQAM 315 of FIG. 3). For example, MAC messages can be generated from another device in the network and transmitted to the EQAM using an Ethernet network. In other implementations, another network can be used to transmit the MAC messages.

At stage 410, DOCSIS-SYNC MAC messages are observed. The DOCSIS-SYNC MAC message can be observed, for example, by an EQAM (e.g., EQAM 115 of FIG. 1 and EQAM 215 of FIG. 2 and EQAM 315 of FIG. 3) using the EQAM DOCSIS MAC message observer and timing module (e.g., DOCSIS MAC message observer and timing module 335 of FIG. 3). In some implementations, messages are observed immediately upon receipt. In other implementations, messages can be stored for analysis at a later time.

At stage 415, the time value can be extracted and applied to the EQAM local clock as a starting point. The time value can be extracted and applied to the EQAM local clock, for example, by an EQAM (e.g., EQAM 115 of FIG. 1 and EQAM 215 of FIG. 2 and EQAM 315 of FIG. 3) using an EQAM DOCSIS MAC message observer and timing module (e.g., DOCSIS MAC message observer and timing module 335 of FIG. 3). In some implementations, the EQAM can apply the time value immediately. In other implementations, the EQAM can apply the time value after a delay. In still further implementations, the EQAM can store the time value and apply the value following extraction of a predefined number of time values.

At stage 420, the applied local clock is kept from that point onward and the DOCSIS-SYNC messages are overwritten with values derived from the EQAM local timing clock. The applied local clock can be kept, for example, by an EQAM (e.g., EQAM 115 of FIG. 1 and EQAM 215 of FIG. 2 and EQAM 315 of FIG. 3), and the overwriting of DOCSIS-SYNC messages with EQAM local timing clock can be accomplished, for example, using the EQAM DOCSIS MAC message observer and timing module (e.g., DOCSIS MAC message observer and timing module 335 of FIG. 3). In some implementations, the EQAM can periodically reapply time values from DOCSIS-SYNC MAC messages. In other implementations, the EQAM can track the divergence in time values and readjust in a real-time, as-needed basis. The process 400 ends at stage 425.

Figure 5:
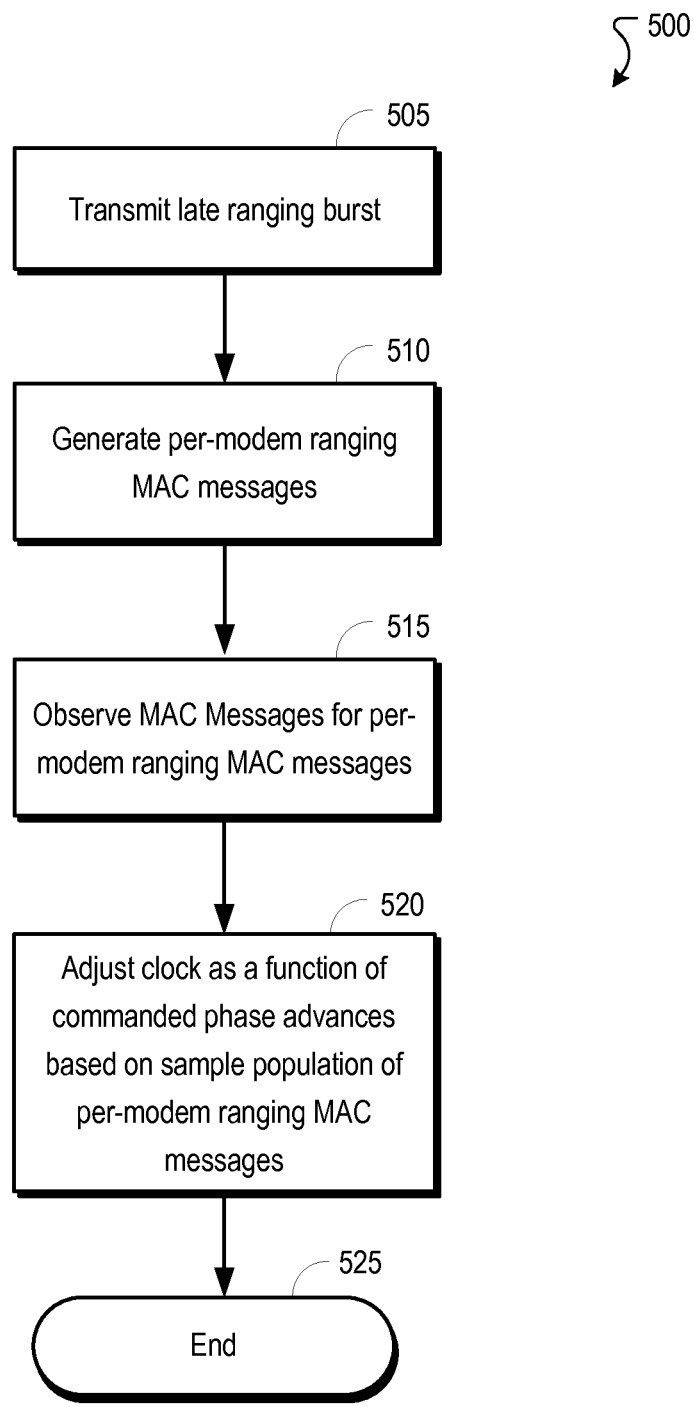
FIG. 5 is a flowchart illustrating an example process operable to provide EQAM and M-CMTS core timing lock using per-modem ranging MAC messages.

FIG. 5 is a flowchart illustrating an example process operable to provide EQAM and M-CMTS core timing lock using per-modem ranging MAC messages. The process 500 begins at stage 505 by the modem transmitting a "ranging burst" later to the M-CMTS core. The transmission of the "ranging burst" late (e.g., at a later time value than anticipated by the M-CMTS core) to the M-CMTS can be done, for example, by a CM (e.g., CM 125 of FIG. 1 and CM 225 of FIG. 2 and CM 325 of FIG. 3) using upstream communications to the M-CMTS core (e.g., M-CMTS core 105 of FIG. 1 and M-CMTS core 205 of FIG. 2 and M-CMTS core 305 of FIG. 3). In some implementations, one or more MAC messages can be generated from the CM and transmitted to the M-CMTS core to signify a divergence in timing.

At stage 510, per-modem ranging MAC messages are generated and transmitted to CMs. The per modem ranging MAC messages can be generated and transmitted, for example, by a M-CMTS core (e.g., M-CMTS core 105 of FIG. 1 and M-CMTS core 205 of FIG. 2 and M-CMTS core 305 of FIG. 3) to one or more CMs (e.g., CM 125 of FIG. 1 and CM 225 of FIG. 2 and CM 325 of FIG. 3) using the M-CMTS core downstream MAC and DEPI interface (i.e., downstream MAC and DEPI interface 330 of FIG. 3). In some implementations, the M-CMTS core can use another message to correct late timing by the CMs.

At stage 515, MAC ranging messages from a M-CMTS core can be observed on a per-modem ranging basis. For example, the EQAM (e.g., EQAM 115 of FIG. 1 and EQAM 215 of FIG. 2 and EQAM 315 of FIG. 3) can observe the ranging messages using the EQAM DOCSIS MAC message observer and timing module (e.g., DOCSIS MAC message observer and timing module 335 of FIG. 3). In some implementations, messages can be observed immediately upon receipt. In other implementations, messages can be stored for analysis at a later time. It should be understood that messages generated from the M-CMTS core addressed to CMs can first be channeled through an associated EQAM device.

At stage 520, the local timing clock can be adjusted as a function of commanded phase advances based upon a sample population of per-modem ranging MAC messages. For example, the EQAM (e.g., EQAM 115 of FIG. 1 and EQAM 215 of FIG. 2 and EQAM 315 of FIG. 3) can make adjustments to the local timing clock using a sample population of per-modem ranging MAC messages. This can be accomplished, for example, using the EQAM DOCSIS MAC message observer and timing module (e.g., DOCSIS MAC message observer and timing module 335 of FIG. 3). In some implementations, the EQAM can apply the population based on a fixed number of per-modem ranging MAC messages. In other implementations, the EQAM can track the divergence in time values and readjust in a real-time, as-needed basis. In still further implementations, per-modem ranging MAC message time differences can be applied immediately without regard to population. It should be understood that a population of per-modem ranging MAC messages can be used to reduce the likelihood of overreacting to any particular CM timing issue. The process 500 ends at stage 525.

Figure 6:
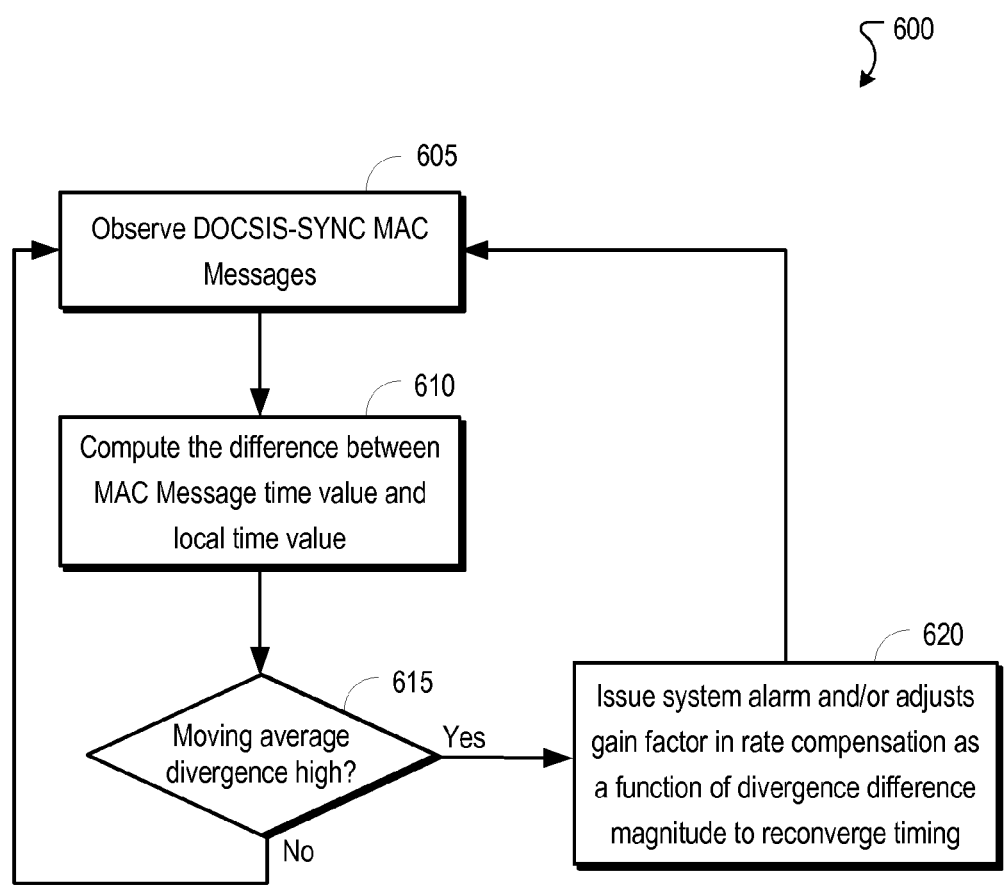
FIG. 6 is a flowchart illustrating an example process operable to provide EQAM and M-CMTS core timing lock check and adjustment.

FIG. 6 is a flowchart illustrating an example process operable to provide EQAM and M-CMTS core timing lock check and adjustment. The process 600 begins at stage 605 when DOCSIS-SYNC MAC messages are observed. DOCSIS-SYNC MAC messages can be observed, for example, by the EQAM (e.g., EQAM 115 of FIG. 1 and EQAM 215 of FIG. 2 and EQAM 315 of FIG. 3) using the EQAM DOCSIS MAC message observer and timing module (e.g., DOCSIS MAC message observer and timing module 335 of FIG. 3). In some implementations, messages can be observed immediately upon receipt. In other implementations, messages can be stored for analysis at a later time. It should be understood that messages generated from the M-CMTS core addressed to CMs can first be channeled through an associated EQAM device.

At stage 610, a difference between MAC message time values and the EQAM local time value can be computed and stored. The difference can be computed, for example, by an EQAM (e.g., EQAM 115 of FIG. 1 and EQAM 215 of FIG. 2 and EQAM 315 of FIG. 3) using the EQAM DOCSIS MAC message observer and timing module (e.g., DOCSIS MAC message observer and timing module 335 of FIG. 3). In some implementations, the computation can be another mathematical computation performed in conjunction with the difference calculation. In other implementations, the storage of the observation can occur in locally in the EQAM or transmitted to an external computing device.

At stage 615, a determination can be made whether the moving average divergence is high enough for the EQAM to take action. The determination can be made, for example, by the EQAM (e.g., EQAM 115 of FIG. 1 and EQAM 215 of FIG. 2 and EQAM 315 of FIG. 3) DOCSIS MAC message observer and timing module (e.g., DOCSIS MAC message observer and timing module 335 of FIG. 3). In some implementations, another metric can be computed, tracked, and compared instead of a moving average such as, for example, a threshold value.

If the divergence is high enough for the EQAM to take action, then at stage 620 a system alarm can be issued and/or the gain factor in the rate compensation function can be modified as a function of the divergence difference magnitude to re-converge timing. The system alarm and modification of gain factor can be accomplished, for example, by the EQAM (e.g., EQAM 115 of FIG. 1 and EQAM 215 of FIG. 2 and EQAM 315 of FIG. 3) using a DOCSIS MAC message observer and timing module (e.g., DOCSIS MAC message observer and timing module 335 of FIG. 3). The process then returns to stage 605. In some implementations, the time value can be adjusted by another method that does not require calculation of a gain factor. In other implementations, the process ends following an issuance of an alarm and/or adjustment of timing value.

If the divergence not is high enough for the EQAM to take action, then the process 600 returns to stage 605 to observe further incoming DOCSIS-SYNC MAC messages. The return to stage 605 can be accomplished by the EQAM (e.g., EQAM 115 of FIG. 1 and EQAM 215 of FIG. 2 and EQAM 315 of FIG. 3) DOCSIS MAC message observer and timing module (e.g., DOCSIS MAC message observer and timing module 335 of FIG. 3). The process can continue recursively. In some implementations, the process can end at any time.

Figure 7:
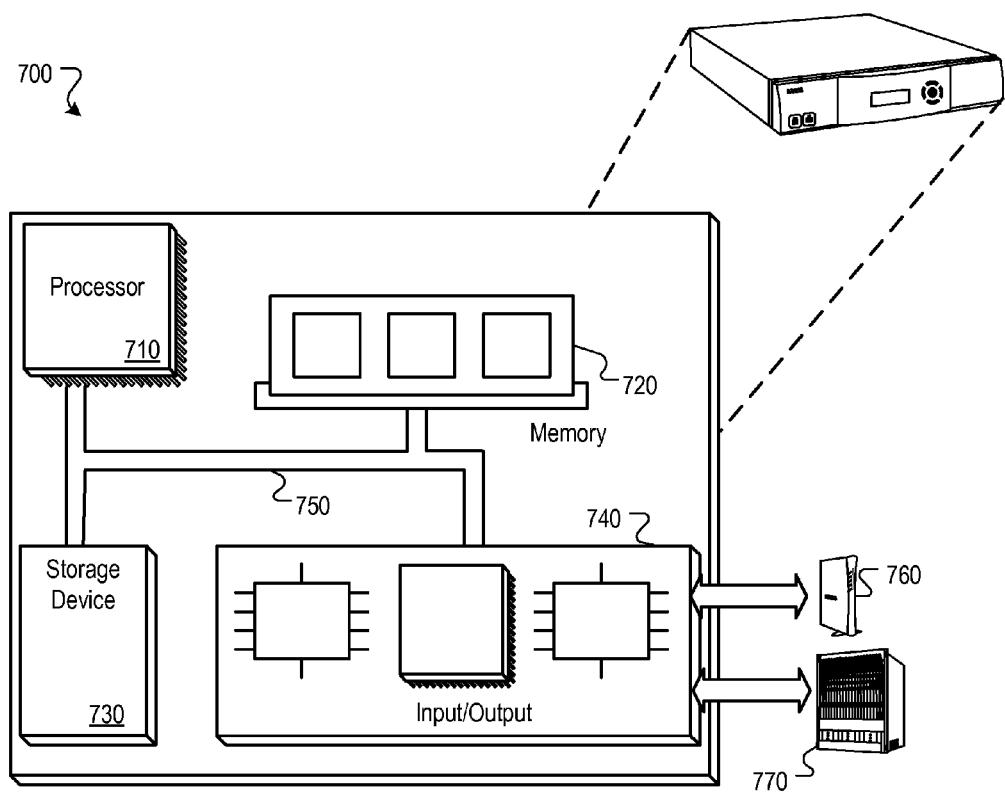
FIG. 7 is a block diagram of an EQAM device operable to provide EQAM and M-CMTS core timing lock.

FIG. 7 is a block diagram of an EQAM device operable to provide EQAM and M-CMTS core timing lock. The timing lock EQAM device 700 can include a processor 710, a memory 720, a storage device 730, and an input/output device 740. Each of the components 710, 720, 730, and 740 can, for example, be interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the device 700. In one implementation, the memory 720 is a computer-readable medium. In one implementation, the memory 720 is a volatile memory unit. In another implementation, the memory 720 is a non-volatile memory unit.

In some implementations, the storage device 730 is capable of providing mass storage for the device 700. In one implementation, the storage device 730 is a computer-readable medium. In various different implementations, the storage device 730 can, for example, include a hard disk device, an optical disk device, flash memory or some other large capacity storage device.

The input/output device 740 provides input/output operations for the device 700. In one implementation, the input/output device 740 can include one or more of a wireless interface, CM device 760 (e.g., CM device 125 of FIG. 1 and CM device 225 of FIG. 2 and CM device 325 of FIG. 3) or a M-CMTS core 770 (e.g., M-CMTS core 105 of FIG. 1 and M-CMTS core 205 of FIG. 2 and M-CMTS core 305 of FIG. 3). In addition, such input/output device 740 can communicate with other external devices through interfaces such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., a CM device 760 and/or M-CMTS core 770), as well as sending communications to, and receiving communications from various networks.

The device (e.g., an EQAM device) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a phone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A system, comprising:
    a broadband communication system configured to transmit digital data and receive radio frequency (RF) modulated data, the broadband communication system being further configured to use a first local clock signal;
    one or more modulator systems, executed on a processing device, configured to receive digital data, modulate the digital data, and transmit the RF modulated data, the one or more modulator systems being further configured to use a second local clock signal;
    a communication path for connecting the broadband communication system to the one or more modulator systems;
    the broadband communication system including a media access control module configured to provide media access control for data transmissions;
    the media access control module configured to transmit a plurality of media access control messages with a first time value, the first time value being based on the first local clock signal;
    the one or more modulator systems being configured to replace the first time value in the plurality of media access control messages with a second time value based on the second local clock signal and transmit the media access control messages as the RF modulated data to one or more customer premise devices;
    the one or more modulator systems being configured to adjust the second local clock based on a computation derived from the one or more first time values, track a divergence of the first time values in the plurality of media access control messages, and, when the divergence reaches a threshold, adjusting the second local clock based on the divergence, wherein the adjustment to the second local clock is made without feedback from the broadband communication system; and
    the one or more modulator systems being configured to further adjust the second local clock based on a plurality of ranging media access control messages.

2. The system of claim 1, wherein the computation comprises using the first time value from one of the media access control messages as the second local clock value.

3. The system of claim 1, wherein the computation comprises periodically updating the second time value with the first time value using a plurality of media access control messages.

4. The system of claim 1, wherein a moving average is used as the computation of the divergence.

5. The system of claim 1, wherein an alarm is issued if the divergence reaches a threshold.

6. The system of claim 1, wherein the broadband communication system is based on DOCSIS.

7. The system of claim 6, wherein the communication path comprises ethernet.

8. The system of claim 7, wherein the modulation comprises quadrature amplitude modulation.

9. The system of claim 1, wherein the modulator system is further configured to adjust the second local clock, and the system further comprises:

the plurality of customer premise equipment devices each configured to transmit and receive RF signals;

a communication path for connecting the broadband communication system and the one or more modulator systems to the plurality of customer premise equipment devices;

the plurality of customer premise equipment devices configured to transmit a plurality of ranging burst media access control messages;

the broadband communication system being further configured to receive the ranging burst media access control messages, compute third time values for each respective customer premise equipment device based on a timing divergence, and transmit a plurality of ranging media access control messages with the third time values to the modulator system; and the modulator system being further configured to receive the third time values and adjust the second local clock based on the third time value.

10. The system of claim 9, wherein the modulator system is configured to adjust the second local clock based on a subset of the ranging media access control messages selected from a sample population of the customer premise equipment devices.

11. The system of claim 10, wherein the modulator system is further configured to adjust said second local clock based on the timing divergence associated with the third time values.

* * * * *